US008918616B2

(12) United States Patent
Hsia

(10) Patent No.: US 8,918,616 B2
(45) Date of Patent: Dec. 23, 2014

(54) MEMORY ALLOCATION ANALYSIS

(75) Inventor: Calvin Hsia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 13/217,224

(22) Filed: Aug. 24, 2011

(65) Prior Publication Data

US 2013/0054926 A1 Feb. 28, 2013

(51) Int. Cl.
*G06F 12/00* (2006.01)
*G06F 12/02* (2006.01)
*G06F 3/06* (2006.01)

(52) U.S. Cl.
CPC .............. *G06F 12/02* (2013.01); *G06F 3/0604* (2013.01); *G06F 3/0608* (2013.01); *G06F 12/023* (2013.01); *G06F 3/0641* (2013.01)
USPC ........... 711/170; 711/154; 711/217; 717/124; 717/128; 714/42; 707/813; 707/814; 707/815; 707/816

(58) Field of Classification Search
None
See application file for complete search history.

(56) References Cited

U.S. PATENT DOCUMENTS

| | | | |
|---|---|---|---|
| 5,809,554 A | 9/1998 | Benayon | |
| 5,920,876 A | 7/1999 | Ungar | |
| 5,949,972 A * | 9/1999 | Applegate | ........................ 714/54 |
| 6,560,773 B1 | 5/2003 | Alexander, III | |
| 6,643,753 B2 | 11/2003 | Avner | |
| 6,658,652 B1 | 12/2003 | Alexander | |
| 6,728,907 B1 * | 4/2004 | Wang et al. | ................... 714/47.1 |
| 6,782,462 B2 | 8/2004 | Marion et al. | |
| 6,889,297 B2 * | 5/2005 | Krapp et al. | ................... 711/159 |
| 7,089,460 B2 | 8/2006 | Fu | |
| 7,111,294 B2 | 9/2006 | Steensgaard | |
| 7,200,731 B2 | 4/2007 | Raut | |
| 7,284,107 B2 | 10/2007 | Wilman | |
| 7,487,321 B2 | 2/2009 | Muthiah et al. | |
| 7,500,077 B2 | 3/2009 | Krauss | |
| 7,500,079 B2 | 3/2009 | Becker | |
| 7,506,129 B2 | 3/2009 | Raut | |
| 7,577,943 B2 | 8/2009 | Chilimbi et al. | |
| 7,716,648 B2 | 5/2010 | Vaidyanathan et al. | |
| 7,761,852 B2 | 7/2010 | Gilgen | |
| 7,774,741 B2 | 8/2010 | Sridharan | |
| 7,827,538 B2 | 11/2010 | Trotter | |
| 7,870,358 B2 | 1/2011 | Yang | |
| 7,908,454 B2 | 3/2011 | Leung | |

(Continued)

OTHER PUBLICATIONS

Jonas Maebe, et al;Precise Detection of Memory Leaks; pp. 1-7.

(Continued)

*Primary Examiner* — Matthew Bradley
*Assistant Examiner* — Alan Otto
(74) *Attorney, Agent, or Firm* — Kevin Sullivan; Kate Drakos; Micky Minhas

(57) ABSTRACT

The subject disclosure relates to analyzing memory allocations for one or more computer-implemented processes. In particular, in conjunction with employing tags for tracking memory allocation commands, currently allocated memory can be examined for various characteristics of inefficient memory use. For example, as memory is initially allocated, a predetermined bit pattern can be written to the newly allocated memory. Thus, detection of the predetermined bit pattern can be indicative of wasted memory use. Moreover, additional features can be provided to both analyze data and present views associated with that analysis relating to identification of memory fragmentation, over-allocation, sparse memory use, duplication of allocations, multiple module loads, and so forth.

20 Claims, 15 Drawing Sheets

(56) References Cited

U.S. PATENT DOCUMENTS

| | | |
|---|---|---|
| 2002/0116573 A1* | 8/2002 | Gold .......................... 711/111 |
| 2005/0081190 A1 | 4/2005 | Betancourt |
| 2006/0195823 A1 | 8/2006 | Bentolila |
| 2009/0328007 A1 | 12/2009 | Chen et al. |
| 2010/0031238 A1 | 2/2010 | Li et al. |

OTHER PUBLICATIONS

Detours; Microsoft Research; May 13, 2011.
ICorProfilerCallback Interface; May 13, 2011.
Umdhtools.exe_How to use Umdh.exe to find Memory Leaks; Article ID 268343; Last Review Apr. 25, 2007.
Calvin Hsia, Examin.Net Memory Leaks; MSDN Blogs; Apr. 11, 2008.
SOS.dll; SOS Debugging extension; May 13, 2011.
Xie, et al., Context and Path sensitive Memory Leak Detection:, Retrieved at <<http://citeseerx.ist.psu.edu/viewdoc/download-?doi+10.1.1.88.2239&rep=rep1&type=pdf>>, In the proceedings of the 10th European software engineering conference held jointly with 13th ACM SIGSOFT international symposium on Foundations of software engineering, vol. 30, Issue 5, Sep. 5-9, 2005, pp. 115-125.
Xu, et al., "Path and Context Sensitive Inter-procedural Memory Leak Detection", Retrieved at <<http//lcs.ios.ad.cn/~xzx/memleak.pdf>>, Proceedings of the 2008 The Eighth International Conference on Quality Software, 2008, pp. 9.
Kiyokuni Kawachiya, et al., Analysis and Reduction of Memory Inefficiencies in Java Strings, Oct. 19-23, 2008.
Kiyokuni Kawachiya, et al., An Efficient Heap Management Technique with Minimum Fragmentation and Auto Compaction, Jul. 29, 2010.
Mark Russinovich and Bryce Cogswell, VMMap v3.03, May 13, 2011.
Office Action mailed Dec. 20, 2013, in U.S. Appl. No. 13/217,222, 19 pages.
Office Action mailed Dec. 20, 2014, in U.S. Appl. No. 13/216,275, 19 pages.
Notice of Allowance mailed Jun. 12, 2014, in U.S. Appl. No. 13/216,275, 8 pages.
Office Action mailed Aug. 28, 2014, in U.S. Appl. No. 13/217,222, 23 pages.

* cited by examiner

```
Dbl-Click address to see entire block & CallStack
00416108:  2f31308c  00000043  0000020f  00000001  003a0043  0033005c  00650073  00730072
00416128:  0063003c  004c0061  00690076  0068006a  0041005c  00700070  00610044  00810074
00416148:  2f31308c  00000043  0000020f  00000001  003a0043  0033005c  00650073  00730072
00416168:  0063003c  004c0061  00690076  0068006a  0041005c  00700070  00610044  00810074
00416188:  2f31308c  00000043  0000020f  00000001  003a0043  0033005c  00650073  afafafaf
004161a8:  afafafaf  afafafaf  afafafaf  afafafaf  afafafaf  afafafaf  afafafaf  afafafaf
004161c8:  afafafaf  afafafaf  afafafaf  afafafaf  afafafaf  afafafaf  afafafaf  afafafaf
004161e8:  afafafaf  afafafaf  afafafaf  afafafaf  afafafaf  afafafaf  afafafaf  afafafaf
00416208:  afafafaf  afafafaf  afafafaf  afafafaf  afafafaf  afafafaf  afafafaf  afafafaf
00416228:  afafafaf  afafafaf  afafafaf  afafafaf  afafafaf  afafafaf  afafafaf  afafafaf
00416248:  afafafaf  afafafaf  afafafaf  afafafaf  afafafaf  afafafaf  afafafaf  afafafaf
00416268:  afafafaf  afafafaf  afafafaf  afafafaf  afafafaf  afafafaf  afafafaf  afafafaf
00416288:  afafafaf  afafafaf  afafafaf  afafafaf  afafafaf  afafafaf  afafafaf  afafafaf
004162a8:  afafafaf  afafafaf  afafafaf  afafafaf  afafafaf  afafafaf  afafafaf  afafafaf
004162c8:  afafafaf  afafafaf  afafafaf  afafafaf  afafafaf  afafafaf  afafafaf  afafafaf
```

MEMORY ALLOCATION ANALYSIS

CROSS-REFERENCE TO RELATED APPLICATIONS

This application is related to co-pending U.S. patent application Ser. No. 13/217,222 entitled, "MEMORY ALLOCATION TRACKING", filed on Aug. 24, 2011, and to co-pending U.S. patent application Ser. No. 13/216,275 entitled, "AUTOMATIC MEMORY LEAK DETECTION", filed on Aug. 24, 2011, the entireties of each of which applications are incorporated herein by reference.

TECHNICAL FIELD

The subject disclosure generally relates to analyzing computer system memory that is allocated by processes running on a computer, including both contents of the memory as well as allocation of the memory.

BACKGROUND

In the domain of software application development, some of the most widespread difficulties relate to inefficient use of computer memory. However, detecting inefficient memory use in a manner that can be useful to software developers has been an exceptionally difficult task. As a result, there are few tools on the market today that can provide any but the most rudimentary aid in identifying inefficient memory use.

One reason for the difficulties associated with inefficient memory use is that memory is largely invisible to both users and developers at any but the highest levels of abstraction. For example, a process executing on a computer has at least one memory heap allocated for its execution, but in many cases that process can have several memory heaps. Over time, a heap's memory can become fragmented, just as hard disk drives do. Yet, conventional tools provide no ability to observe or even detect this fragmentation. Yet, the consequences of memory fragmentation can be just as problematic as hard disk drive fragmentation.

Furthermore, many memory heaps internally allocate virtual memory for associated use. Yet, these internal allocations are not necessarily efficient. For example, in many cases much of the internally allocated memory is not actually used by an associated application or process. Moreover, it is very common for some memory allocations to be duplicates, and therefore an unnecessary use of memory. Yet conventional tools do not provide any useful way to detect such duplicates.

Still another difficulty that exists in this domain is that some memory allocations result in over-allocation of the memory. For example, a memory allocation call can request 100 bytes, but only 10 bytes are use. Thus, 90 bytes of the memory allocation is wasted. Existing tools cannot detect these inefficient uses. Further, some memory allocation requests are for 0 bytes. These request incur overhead and affect fragmentation, but, like other difficulties noted supra, have no satisfactory existing mechanism for detection.

Still further, a process can have many files or sections of files mapped into its memory space. In some cases, there is shared memory between processes, yet these features are not readily observable today. Virtual memory can be freely allocated by an application or process, yet in conventional terms, it is not readily discernable what code was responsible for these memory allocations. In fact, many memory allocations can originate from managed code that is not explicitly issued by native instructions.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiment, the disclosed subject matter can relate to an architecture that can facilitate analysis and presentation of allocated computer system memory. In accordance therewith, the architecture can include an accounting component that can be configured to access at least one tag included in a private heap of computer memory. Typically, the at least one tag can include a call stack associated with a memory allocation instruction that allocates a portion of the computer memory not included in the private heap according to a command from a process executed by an associated processor.

In addition, the architecture can include an analysis component that can be configured to analyze the computer memory in connection with data included in the at least one tag based upon input received. Furthermore, the architecture can include an interface component that can be configured to receive the input and to present output generated by the analysis component.

Moreover, in one or more embodiment, the architecture can provide a method for accessing at least one tag included in a private heap of memory. In particular, the at least one tag can include a call stack associated with a memory allocation command that allocates a portion of the memory according to a command from a process executed by a computer-based processor.

The method can further provide for receiving input associated with the memory and analyzing the memory in connection with data included in the at least one tag based upon the input. Likewise, the method can provide for presenting output associated with the analyzing.

In still another embodiment, the architecture can include an accounting component stored in a computer readable storage medium configured to access at least one tag included in a private heap of computer memory. The at least one tag is created in response to a memory allocation command that allocates a portion of the computer memory not included in the private heap according to a command from a process executed by an associated processor. Thus, the at least one tag can include a call stack associated with the memory allocation command.

The architecture can further include an analysis component configured to analyze the computer memory in connection with data included in the at least one tag based upon input received, and to identify inefficient use of the computer memory by the process. Likewise, the architecture can include an interface component configured to receive the input and to present output generated by the analysis component in connection with the inefficient use of the computer memory.

These and other embodiments are described in more detail below.

BRIEF DESCRIPTION OF THE DRAWINGS

The system and methods for representing synchronization knowledge and/or partial knowledge for multiple nodes sharing subsets of a set of information are further described with reference to the accompanying drawings in which:

FIG. 4 is graphical representation of an example output that provides an example snapshot of the contents of a given range of a heap;

FIG. 7 is graphical representation of an example output that depicts a view of a report of duplicate memory allocations;

FIG. 8 is graphical representation of an example output that illustrates a heap density report;

DETAILED DESCRIPTION

Overview

Figure 1:
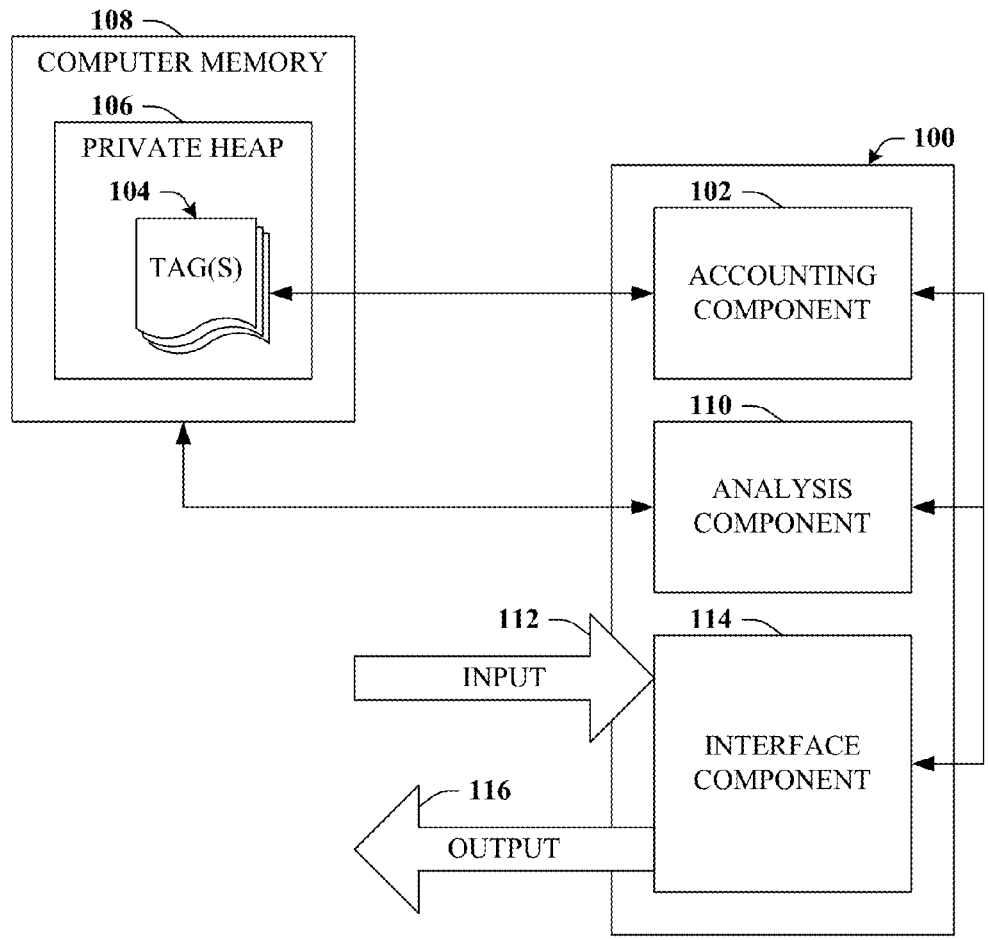
FIG. 1 illustrates a block diagram of an exemplary non-limiting system that can analyze computer-based memory allocations and present results of the analysis.

By way of an introduction, the subject matter disclosed herein relates to various embodiments relating to analysis of computer-based memory allocations as well as presentation of various views resulting from the analysis. In particular, the subject matter can provide a mechanism to intercept certain memory allocation transactions or calls. Upon interception, the requested memory allocation can be met, while pre-filling that newly allocated memory with a particular signature, which can be a default signature, a signature based upon input, or all zeros, e.g., in the case the memory allocation requires the memory to be formatted with zeros.

Thus, aspects of the disclosed subject matter can create a snapshot of the allocated memory in order to detect and present allocations with some number, N, consecutive instances of the signature, where N can be a default or specified based upon input. In addition, aspects of the disclosed subject matter can provide a heap density report that can list all of one or more heap's currently live allocations. This report can be sorted in various ways, particularly by memory address. As such, any gaps over a threshold (e.g., gaps larger than a particular threshold) can be counted and the number of gaps, the total allocated memory, the total virtual memory of the heap, and so on can be compared to show the fragmentation and the percent utilization.

Moreover, aspects of the disclosed subject matter can provide indications of duplicate allocations of a given heap, a multi-selection of heaps, or a multi-selection of allocations within the given heap. Furthermore, any such allocated memory can be sorted, for instance, sorted by size or sorted by content. In addition, any identical allocations can be presented, indicating duplication. Additionally, aspects of the disclosed subject matter can monitor a total number of bytes ever allocated within a heap. Thus, it can be detected when a heap has an unused allocation, which is a common memory allocation inefficiency.

The disclosed subject matter can also examine threads that are created. For example, memory allocations per thread can be presented according to numerous views. Hence, allocations made by a thread that has exited can be readily detected, which are commonly sources of potential memory use inefficiencies, memory leaks, and so forth. Furthermore, thread local storage indexes and allocations can be examined and presented.

In addition, the disclosed subject matter can analyze and present mapped files, including sections with file names and call stacks. Moreover, every memory allocation can be presented not only with an associated call stack, but presented with the raw memory data as well. Thus, various strings or other objects can be easily interpreted.

Introduction to Memory Tracking

Certain subject matter disclosed herein is directed to analysis of memory that is allocated by one or more process in execution by a computer-based processor. Accordingly, examples associated with tracking memory as that memory is allocated, and in some cases subsequently released, by the one or more process can be helpful in understanding some aspects, features, or embodiments of the present disclosure. Certain examples of memory tracking have been incorporated into this disclosure by reference, however, in addition, such is briefly summarized infra.

One way to comprehensively track and/or audit computer-based memory allocations can be to provide a mechanism to intercept certain memory transactions or calls, such as, e.g., memory allocations or memory releases or "frees". Such memory transactions can originate from either native code or from managed code, for example, from the process or a related process or thread that issues the memory allocation or from a garbage collection process or routine. Of these memory transactions, those that represent memory allocations can be recorded by way of an associated tag that stores information relating to a particular memory allocation instruction (e.g., the type of allocation, the entity issuing the instruction, the amount of memory, ... ).

Generally, if a corresponding memory release or free instruction is intercepted, then an associated tag is also freed as well, thus eliminating the need for manually matching items when viewing information associated with memory and/or call stacks. It is appreciated that removing tags in connection with memory release commands can be more straightforward when the release command is explicitly issued by native code than when occurring in connection with garbage collection routines in which no explicit release call is provided by the native code, but is instead ordered according to inherent memory management protocols. Thus, the disclosed subject matter can track objects or other memory allocations throughout any garbage collection operation in order, e.g., to determine whether the memory allocation is indeed garbage or to associate the memory allocation that has been moved (e.g., due to a defragmentation operation) by a garbage collection operation with the original memory allocation tag.

In order to effectuate certain memory tracking elements, the disclosed subject matter can record a call stack associated with any given memory allocation instruction, and place that information in the associated tag. Along with the call stack, memory allocations can be tagged with a thread ID, a sequence number (e.g., 0, 1, 2, 3 . . . ) as well as other pertinent information. It is therefore appreciated that data included in a given tag can enable ready recognition of how leftovers are distributed in time with the scenario iteration.

In addition, as introduced above, various objects or other memory allocations can be tracked through garbage collection operations. These allocations can also be tagged with a number of times an object has survived or moved in a garbage collection operation as well as the particular garbage collection generation of the object (e.g., Gen 0, Gen 1, . . . ), which can provide more robust features in connection with managed memory constraints.

Memory Analysis and Presentation

Referring now to the drawings, with reference initially to FIG. 1, system 100 that can analyze computer-based memory allocations and present results of the analysis is depicted. Generally, system 100 can include accounting component 102 that, as with all components described herein can be stored in a computer readable storage medium. Accounting component 102 can be configured to access at least one tag 104 included in private heap 106 of computer memory 108. Private heap 106 can be a special-purpose area of computer memory 108 intended for storage of the at least one tag 104 and/or other data related to tracking or analysis of computer memory 108. Typically, the one or more tag 104 will include a call stack associated with a memory allocation instruction that allocates a portion of computer memory 108, generally a portion not included in private heap 106, according to a command from a process (described in connection with FIG. 2) executed by an associated processor (not shown). Hence, accounting component 102 can manage or access the at least one tag 104 that substantially record relevant information about all or a portion of computer memory 108 that has been allocated by various processes, which is further discussed in connection with FIG. 2.

Figure 2:
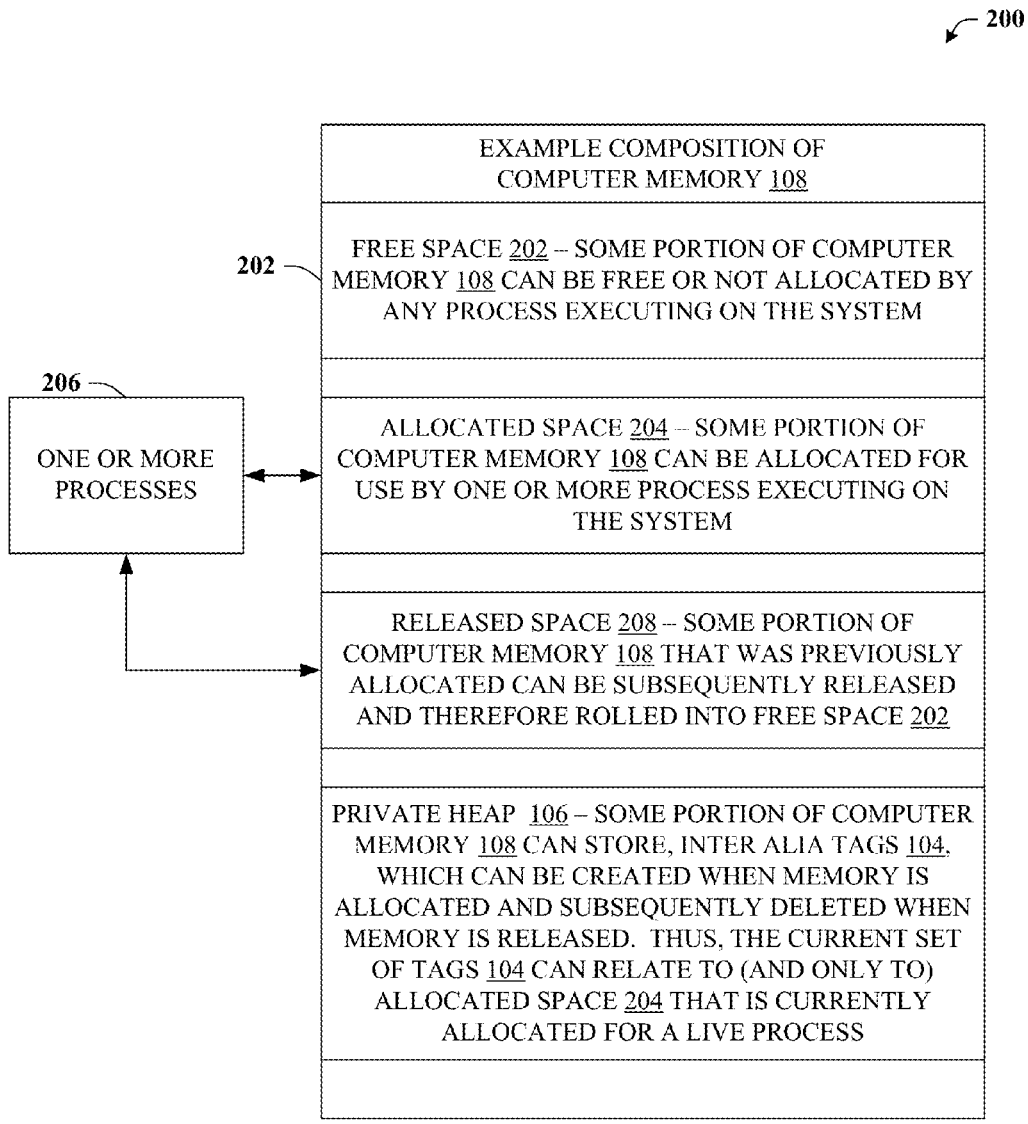
FIG. 2 illustrates a block diagram of an example composition of computer memory at a high level.

While still referring to FIG. 1, but turning now as well to FIG. 2, system 200 that illustrates an example composition of computer memory at a high level. For example, it is understood that some portion of computer memory 108 can be free or not allocated by any process (e.g., one or more process 206) executing on an associated computer system, which is denoted here as free space 202. In addition, some portion of computer memory 108 can be allocated for use by one or more process 206 executing on the computer system. Such is denoted here as allocated space 204, which is space that is being manipulated by one or more process 206 and also the space that is actively tracked by the at least one tag 104.

Likewise, released space 208 can exist in computer memory 108 as well. Released space 208 can relate to some portion of computer memory 108 that was previously allocated (thus, previously included in allocated space 204), but that was subsequently released (e.g., by a memory release instruction issued by one or more process 206) and therefore is now deemed to be free space 202. Furthermore, some portion of computer memory 108 can be allocated to private heap 106. As discussed, private heap 106 can store the at least one tag 104, which can be created when memory is allocated by at least one process 106. In one or more aspect, at least one tag 104 can be deleted in response to receipt of a memory release instruction associated with the memory allocation, e.g., a memory release instruction from one or more process 106.

Thus, when a subsequent release instruction is received, releasing the memory that was allocated when a particular tag was created, that particular tag is also released or deleted. Hence, the current set of tags included in private heap 106 can relate to (and typically only to) allocated space 204 that is currently allocated for one or more process 206. In one or more aspect, the memory allocation instruction and/or the memory release instruction is at least one of a native instruction explicitly issued by the process or a managed instruction that is not explicitly issued by the process or is managed by a second (managed code) process. Therefore, it is understood that the one or more process 106 can include managed processes such as garbage collection routines. It is further understood that the memory release instruction need not be received from the same process from which the associated memory allocation instruction was received.

Continuing the discussion of FIG. 1, system 100 can further include analysis component 110 that can be configured to analyze computer memory 108 in connection with data included in at least one tag 104. Analysis of at least one tag 104 can be based upon input 112 received by analysis component 110 or another component included in system 100. For example, input 112 can relate to a type of analysis to be performed. Furthermore, system 100 can include interface component 114 that can be configured to receive input 112 and further configured to present output 116 generated by analysis component 110. For example, interface component 114 can present various views of data included in computer memory 108, views of various types of data included in computer memory 108, views of the structure of computer memory 108 or the like.

Figure 3:
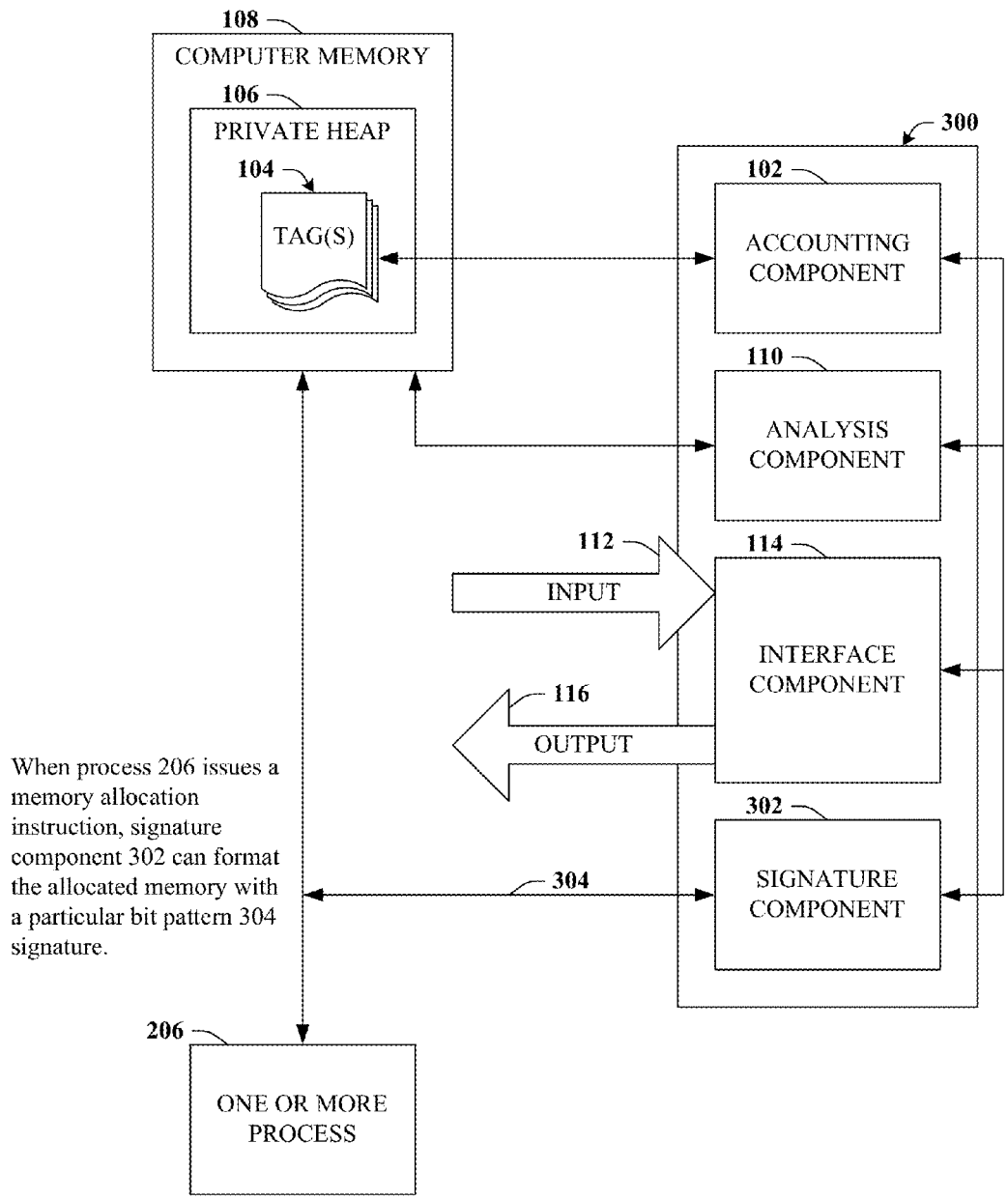
FIG. 3 illustrates a block diagram of an exemplary non-limiting system that provide additional features or aspects in connection with analyzing computer-based memory and presenting results of the analysis.

With reference now to FIG. 3, system 300 that provide additional features or aspects in connection with analyzing computer-based memory and presenting results of the analysis is illustrated. In general, system 300 can include accounting component 102 that can access at least one tag 104 included in private heap 106 as substantially described, supra in connection with FIG. 1. In addition, system 300 can also include analysis component 110 that can analyze computer memory 108 based upon input 112 and interface component 114 that can present output generated by analysis component 110, both of which were also detailed with reference to FIG. 1.

In addition, system 300 can further include signature component 302 that can be configured to write predetermined bit pattern 304 to a portion of computer memory 108 associated with the memory allocation instruction. For example, when one or more process 206 issues a memory allocation instruction to allocate a certain amount of memory for use, signature component 302 can format the bits of the allocated memory with a particular bit pattern signature, namely predetermined bit pattern 304. In one or more aspect, predetermined bit pattern 304 can be defined based upon input 112 received by way of interface component 114. Thus, predetermined bit pattern 304 can be, or can be included in, input 112. As a concrete example, predetermined bit pattern 304 can be associated with, e.g., the decimal number 175 (e.g., provided by way of input 112). The decimal number 175 is, in binary representation "10101111" and in hexadecimal representation is "af".

Accordingly, assuming the decimal number 175 is employed, predetermined bit pattern 304, written to newly allocated memory will be repeating instances of "af". For the remainder of this document, unless indicated otherwise, predetermined bit pattern 304 will be exemplified by "af" which corresponds to decimal 175 and binary "10101111". One particular distinction from this convention is the case of memory that is allocated by way of a VirtualAlloc command, which automatically initializes memory with zeroes. Another distinction from this convention is a HeapAlloc in which it is expressly requested that memory be formatted with zeroes upon allocation. Hence, in either case, predetermined bit pattern 304 is defined as a set of consecutive zeros consistent with the memory allocation instruction (e.g., VirtualAlloc or HeapAlloc with an explicit request).

With the above in mind various additional features, aspects, and/or embodiments can now be described. In particular, FIGS. 4-10 relate to various example outputs that can be provided by interface component 114. Hence, FIGS. 4-10 are intended to be reviewed in connection with FIG. 3 and any such example output can be included in output 116 of FIG. 3.

Referring now to FIG. 4, example output 400 provides an example snapshot of the contents of a given range of a heap. Example output 400 can be all or a portion of output 116 of FIG. 1. It can be readily appreciated that memory with "af" represented as its contents pertains to memory that is, at least up to the time in which the snapshot is viewed, likely to have been unused by any process. In contrast, any memory that differs from this predetermined bit pattern 304 has been utilized for storage by the process. As a result, detection of predetermined bit pattern 304 can be employed in connection with analyzing various types of memory waste or other memory inefficiencies. For example, such waste can relate to over-allocation (e.g., a process allocates 10,000 bytes, but only 10 bytes are used), sparse memory use (e.g., a process allocated 10,000 bytes, but only 5 bytes per every 100-byte block is used), and so forth.

Accordingly, in one or more aspect, analysis component 110 can be further configured to examine a snapshot of computer memory 108 and to detect at least one instance of predetermined bit pattern 302 within computer memory 108. Moreover, in one or more aspect, interface component 114 can be further configured to receive input 112 associated with a minimum number of consecutive instances of predetermined bit pattern 302. Furthermore, in response, interface component 114 can present at least one portion of computer memory 108 that satisfies the minimum number along with suitable data included in an associated tag. In addition, in one or more aspect, analysis component 102 can be further configured to calculate wasted memory according to a function of a number of instances of predetermined bit pattern 302. These and other aspects are further detailed with reference to FIG. 5.

Figure 5:
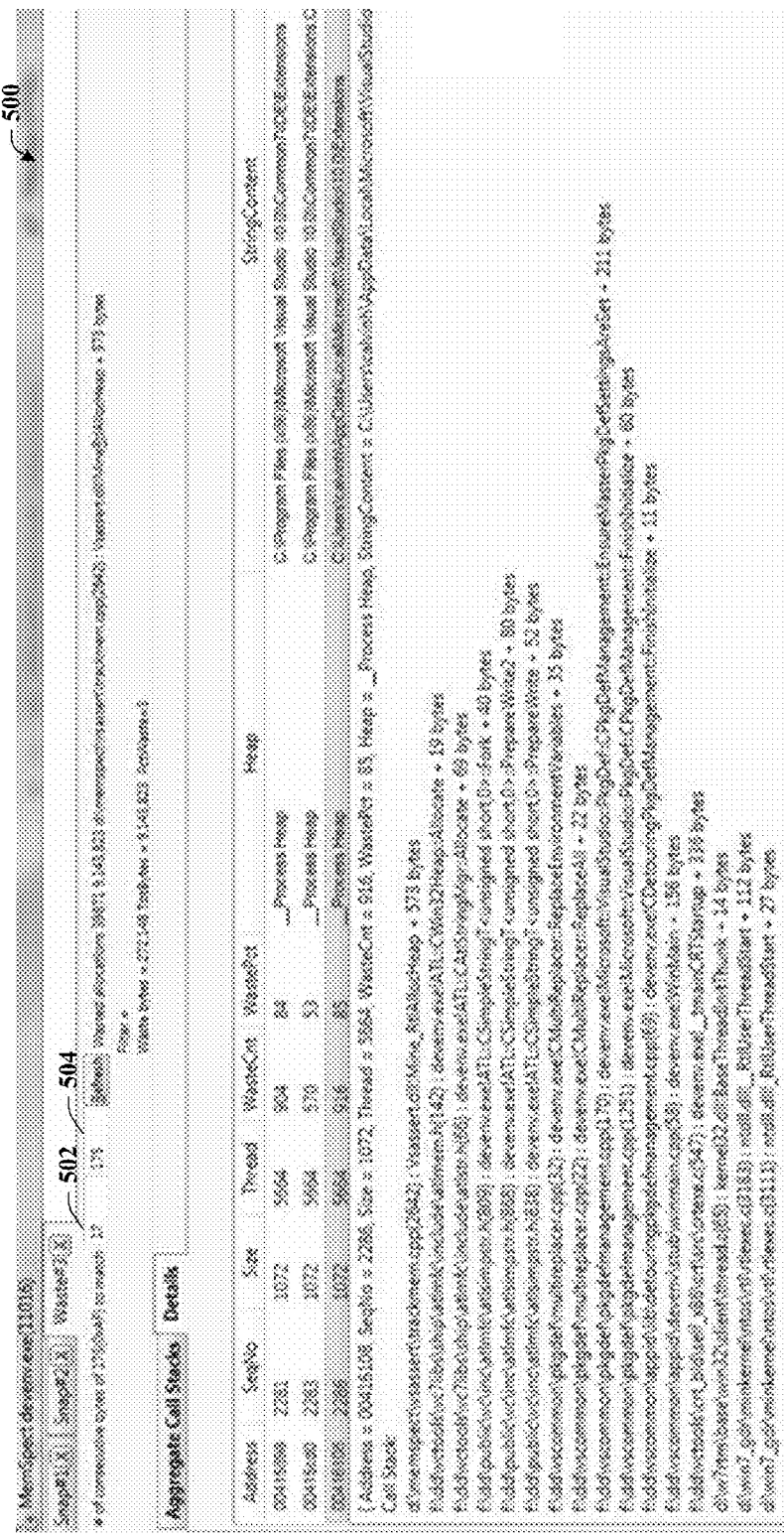
FIG. 5 is graphical representation of an example output illustrating a view of potential wasted memory.

Turning now to FIG. 5, example output 500 illustrating a view of potential wasted memory is depicted. Once more, example output 500 can be all or a portion of output 116 of FIG. 1. In this case, the minimum number of consecutive instances of predetermined bit pattern 302 is given as "17", as illustrated by reference numeral 502. Thus, example output 500 can filter any consecutive instances of predetermined bit pattern 302 that is less than 17, and therefore provide details only for instances in which there are more than 17 consecutive instances of predetermined bit pattern 302. In this case predetermined bit pattern 302 is once again defined by the decimal number 175, which is illustrated by reference numeral 504. It is appreciated that in this case, both the minimum number of consecutive instances and predetermined bit pattern 302 can be provided by way of input 112.

As illustrated in the upper-middle section of example output 500, at least three particular allocations satisfy the minimum number requirement (e.g., 17 or more consecutive instances of predetermined bit pattern 302), which are listed according to various columnar data. Any of these three allocations can be selected (in this case, the third allocation is selected), in which case the call stack for that allocation can be displayed in the lower portion of example output 500. Data included in the call stack as well as the "Address" column, "SeqNo" column, "Size" column, and so forth can be obtained from at least one tag 104 stored in private heap 106. In particular, a tag associated with the original memory allocation. Moreover, analysis component 110 can calculate an amount of wasted memory (e.g., "WastePct" column) by comparing the size of a particular memory allocation to the amount of that memory allocation comprising predetermined bit pattern 302.

One example algorithm or logical code for providing such is given as follows:

---

Let nMatchForUnused = 17, or some user specified value for the # of bytes in a row to match
as Unused
Let byteToMatch = 175, or some user specified value for the actual byte for which we want to
mark as Unused
Initialize nWastedTotal = 0
For each user selected allocation (such as an entire heap, or a subset)
   For each byte in the allocation
      § If the allocation size > nMatchForUnused
         Initialize the fPriorWasMatch = false, nMatchesSoFar=0
         Read the actual bytes into a block
           If offline mode, read from the minidump
           If online, read from the actual process memory
         For each block
           For each byte in the block
              § If the byte matches the byteToMatch
                 increment nMatchesSoFar and set fPriorWasMatch = true
              § Else
                 If nMatchesSoFar > nMatchForUnused then
                 nWastedTotal +=
                 nMatchesSoFar
      if nMatchesSoFar > = nMatchForUnused then nWastedTotal +=
      nMatchesSoFar
      if nWastedTotal > 0, add the allocation to the list of Wasted
      Allocations

---

Figure 6:
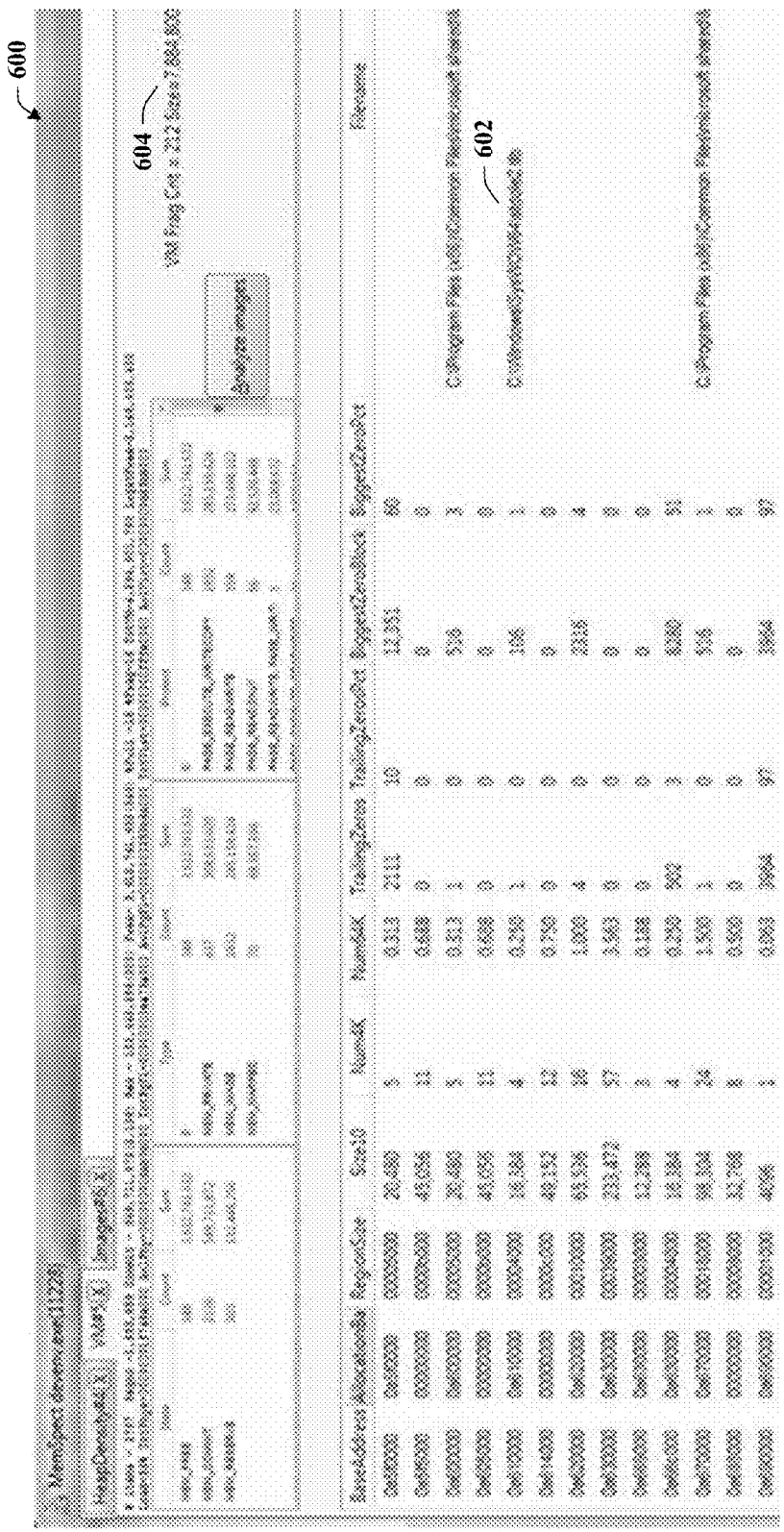
FIG. 6 is graphical representation of an example output providing a view of potential heap memory or virtual memory fragmentation.

With reference now to FIG. 6, example output 600 providing a view of potential heap memory or virtual memory fragmentation. For example, virtual memory, typically called by way of a VirtualAlloc command allocates computer memory 108 in 64 kilobyte chunks. Example output 600 presents a virtual memory block in hexadecimal, decimal, a number of 4-kilobyte pages, and a number of 64-kilobyte pages. Such can be useful given many operating systems utilize virtual memory granularity that is 64 kilobytes and a page size for page swapping and page fault of 4 kilobytes. Here, the number of trailing zeros and the largest block of zeros and their respective percentages are also shown.

Moreover, with reference to reference numeral 602, the file "C:\Windows\SysWOW64\stdole2.tlb" has been mapped to memory. As indicated in a previous column of that row, this file requires about 16 kilobytes, but due to virtual memory granularity of 64 kilobytes, which means 49 kilobytes for this allocation is wasted virtual memory address space. With this view, a developer can easily understand such waste and thereafter take appropriate steps to remedy such in the offending process code (e.g., the code that loaded the file to memory). Moreover, a count and sum of the virtual memory fragmentation is provided at the top of example output 600. In this case, there are 212 such fragments, totaling 7,884,800 bytes wasted, as noted at reference numeral 604.

Figure 7:
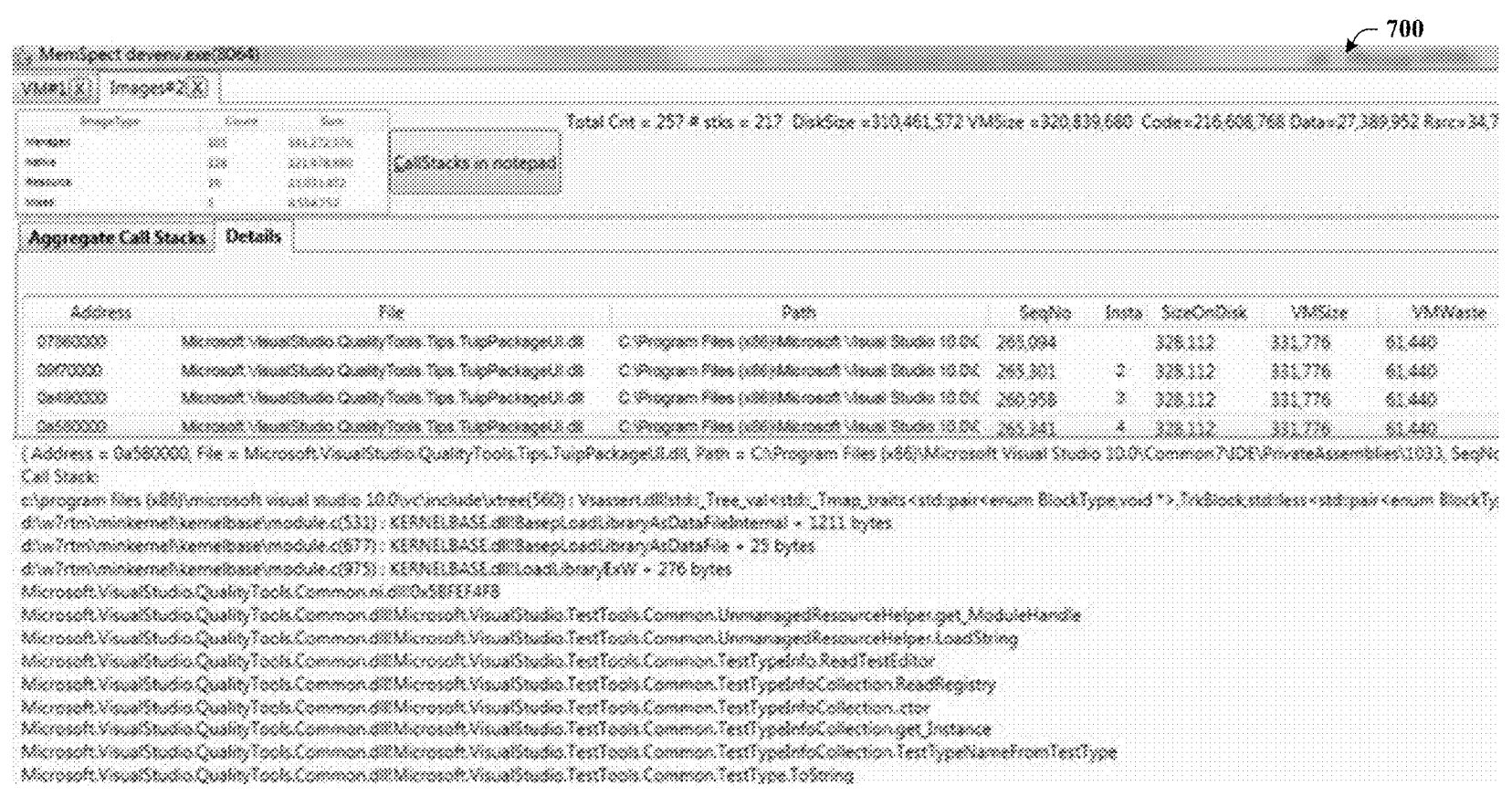

Turning now to FIG. 7, example output 700 depicts a view of a report of duplicate memory allocations. As with other example outputs provided herein, example output 700 can be one view provided by output 116 of FIG. 1. In this case, the report provided by example output 700 indicates that "C:\Program Files (x86)\Microsoft Visual Studio 10.0\Common7\IDE\PrivateAssemblies\1033\ Microsoft-.VisualStudio.QualityTools.Tips.TuipPackageUI.dll" is loaded four times. The tooltip at the bottom of example output 700 shows the call stack for one of those four loads. It is understood that duplicate allocations, such as these four duplicate loads also represent wasted memory space and/or inefficient memory allocation, as the file could be loaded a single time and simply referenced thereafter instead of being loaded multiple times.

Figure 8:
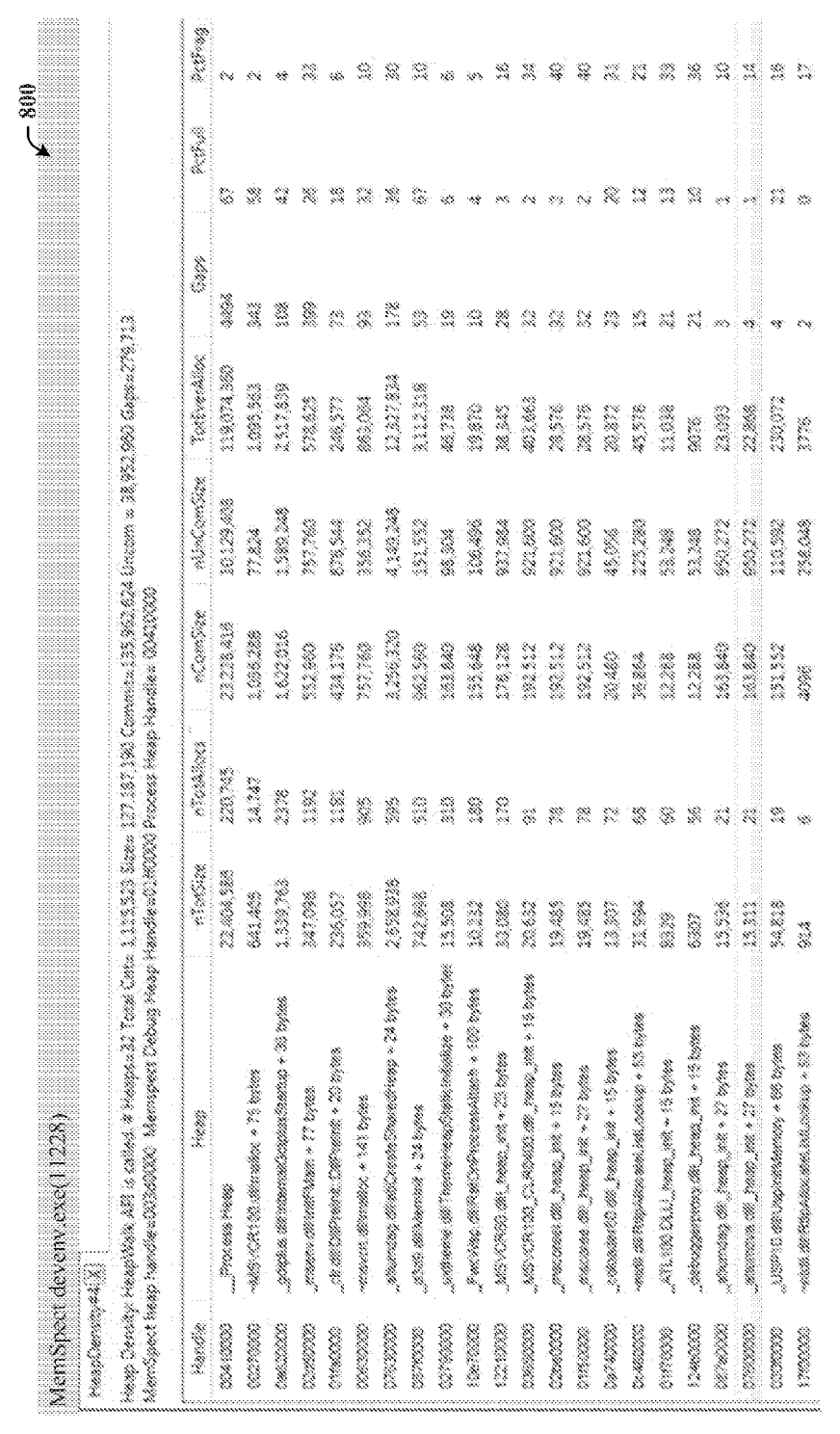

With reference now to FIG. 8, example output 800 illustrates a heap density report. As depicted by example output 800, the heap density report for each heap lists live heap allocations (e.g., those that have been allocated, but as yet, not released). Therefore, any gaps over a particular threshold (e.g., say, 16 bytes) can be counted. The number of gaps, as well as a total amount of memory allocated and the total virtual memory of the heap are compared to show the fragmentation and the percent utilization.

In addition, analysis component 110 can also track or analyze the total number of bytes ever allocated within a particular heap. Such can be useful because many heaps are created yet thereafter never used. In that case, the entire overhead of such a heap is thus wasted. These and other features can be presented by interface component 114 as output 116. For instance, in the first row of example output 800, the last three columns show that this particular process heap has 4494 gaps, the heap is 67% utilized (e.g., 100*TotSize/(nComSize+nUnComSize)), and is 2% fragmented (e.g., 100*nGaps/nTotAllocs).

Figure 9:
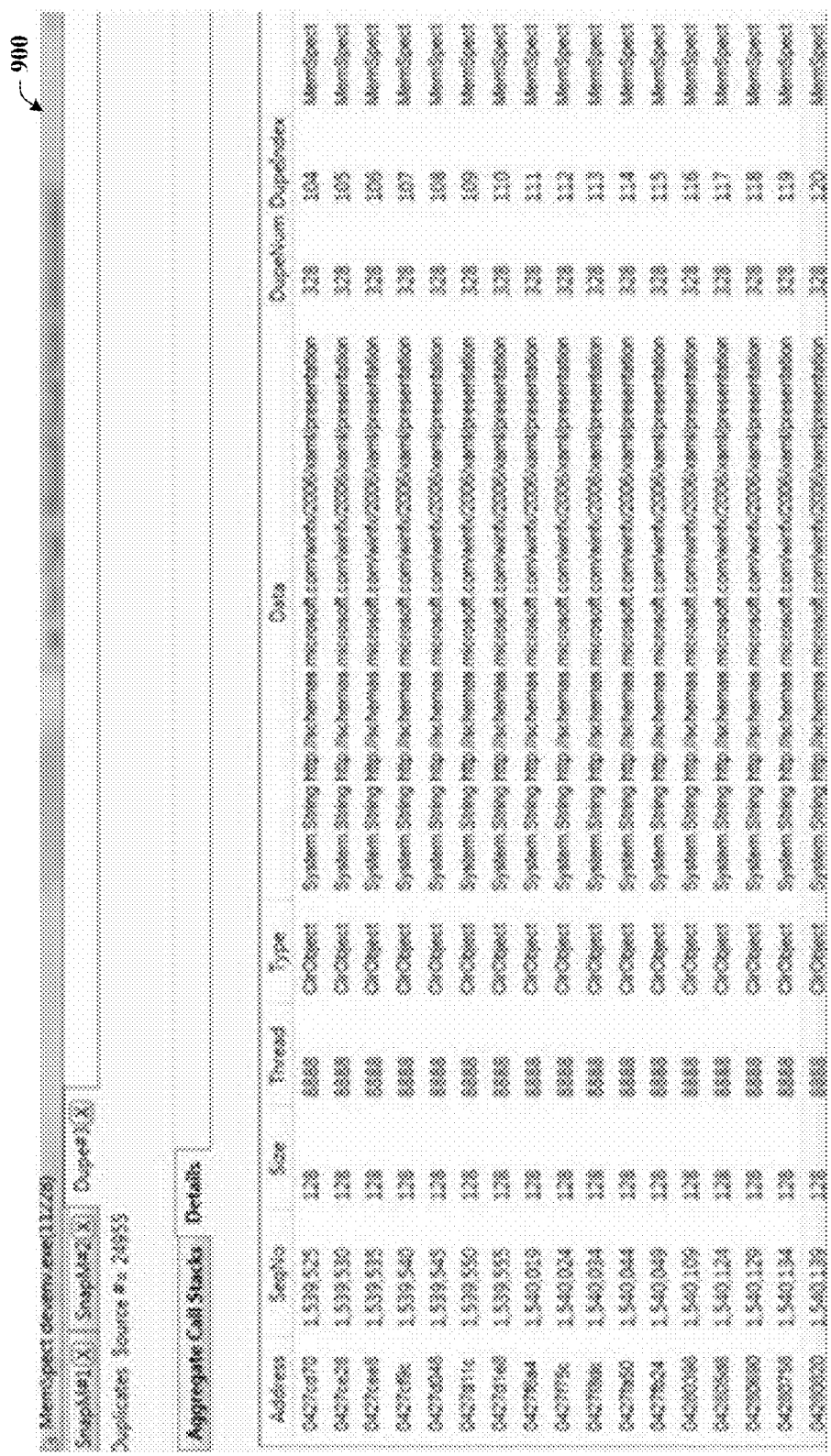
FIG. 9 is graphical representation of an example output that provides a view of duplicate heaps, multi-selection of heaps, and/or a multi-selection of allocations within a heap.
Figure 10:
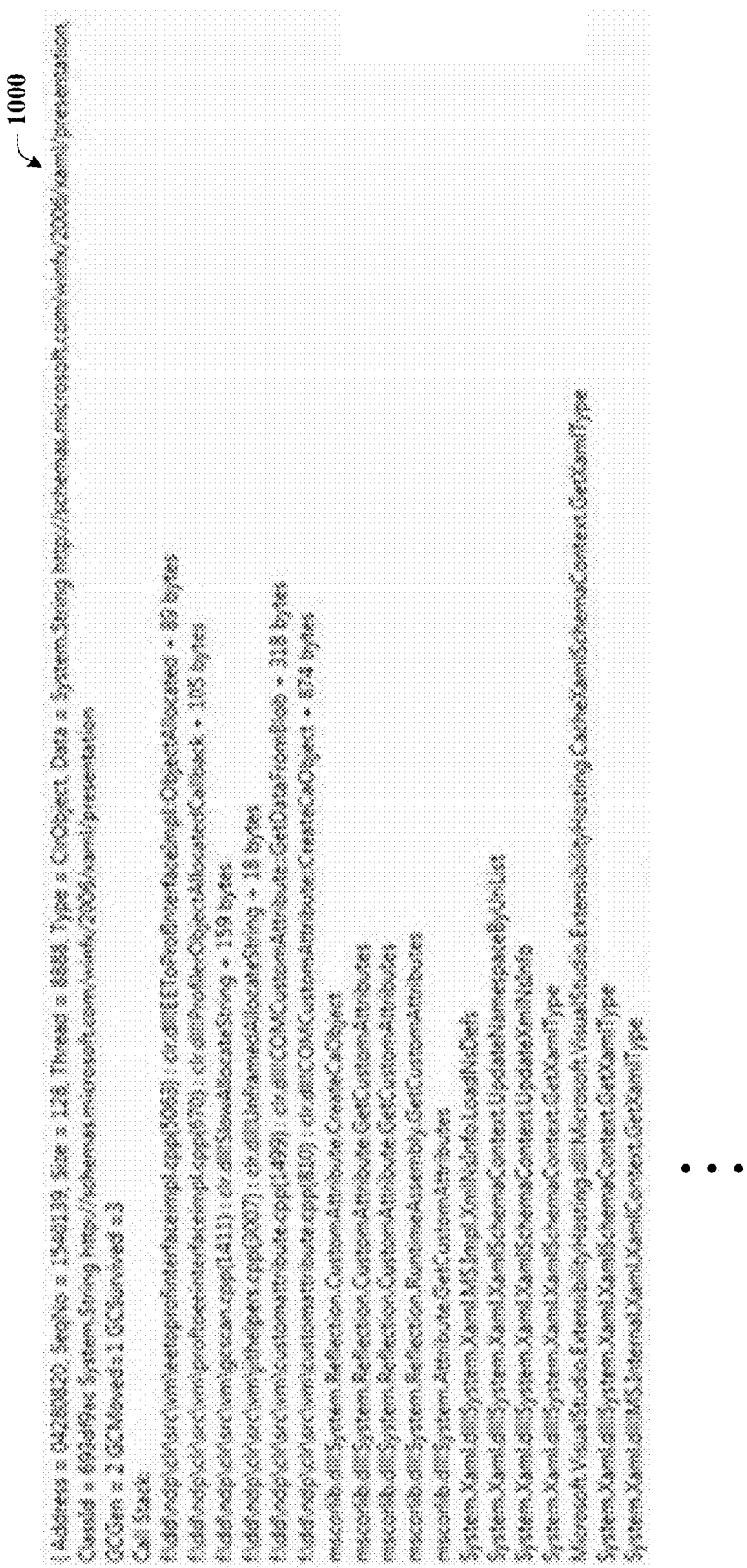
FIG. 10 is graphical representation of an example output that provides a portion of a call stack for a duplicate allocation.

Referring now to FIG. 9, example output 900 provides a view of duplicate heap allocations. Such determinations can be made by analysis component 110 and the actual view of such can be provided by interface component 114 as output 116. In this case, example output 900 can sort all allocations by size and/or content. Moreover, any identical allocations can be shown as well. For example, the final row has been selected, as indicated by the highlight. Here, there are 120 duplicate allocations of the managed string "http://schemas-.microsoft.com/winfx/2006/sam1/presentation". As this string has been selected, an associated tooltip can show the allocator of one of one of those duplicate allocations, which is illustrated with reference to FIG. 10. FIG. 10 can now be reference, which illustrates example output 1000 that provides a portion of a call stack for a duplicate allocation.

It is understood that analysis component 110 can determine the existence of duplicates. An example algorithm or logical code for calculating duplicates can be as follows:
All allocations are sorted. Each allocation can be compared to another allocation:
If the size of the 1st is less than the other, return −1, indicating so
If the size of the 2nd is less than the other, return 1, indicating so
If the address of each is the same, return 0, indicating so
Read the actual block of memory a block at a time
If operating in offline mode, read the memory from the minidump
If online, read the actual memory
Iterate through the block and do a byte by byte comparison until finding a non-match
If the byte from the 1st is less than the other, return −1, indicating so
If the byte from the 2st is less than the other, return 1, indicating so
If all bytes match, return 0, indicating they're identical
Now that allocations are sorted, iterate through the allocations, comparing the current with the prior. If the allocations are the same, add to the duplication list.

Given the above concrete illustrations provided by the example outputs supra in regard to FIGS. 4-10 the following can be readily appreciated. In one or more aspect, analysis component 110 can be further configured to detect duplicate allocations included in computer memory 108. Likewise, interface component 114 can be further configured to present the duplicate allocations along with a call stack associated with at least one of the duplicate allocations.

In addition, analysis component 110 can be further configured to sort at least a portion of computer memory 108 by address and to detect fragmentation associated with computer memory 108. Moreover, analysis component 110 can be further configured to sort according to at least one of size of the fragmentation or according to content of computer memory 108 that is fragmented. Regardless, interface component 114 can be further configured to present output associated with fragmentation detected by analysis component 110 along with suitable data included in an associated tag (e.g., at least one tag 104).

Figure 11:
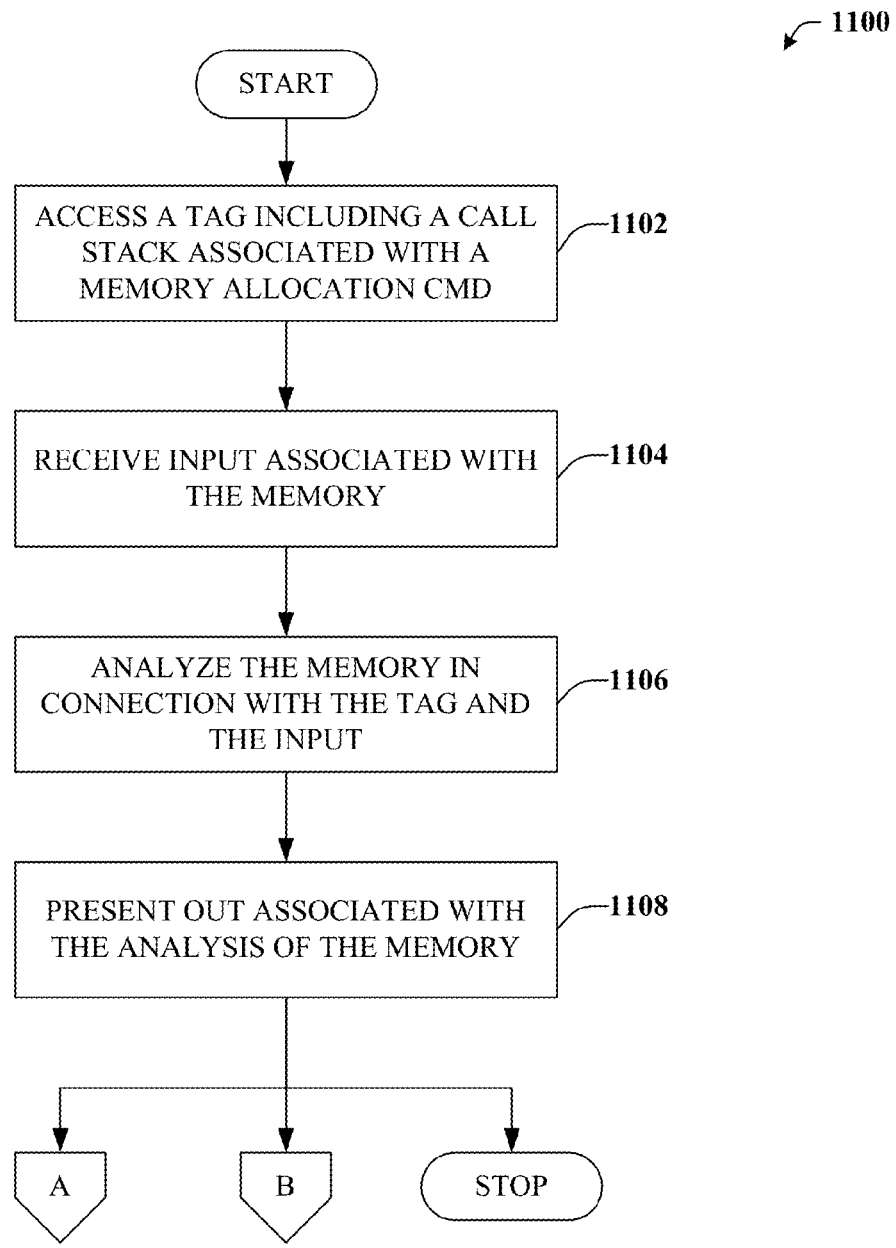
FIG. 11 is an exemplary non-limiting flow diagram for analyzing computer-based memory provisioning and presenting results of the analysis.
Figure 12:
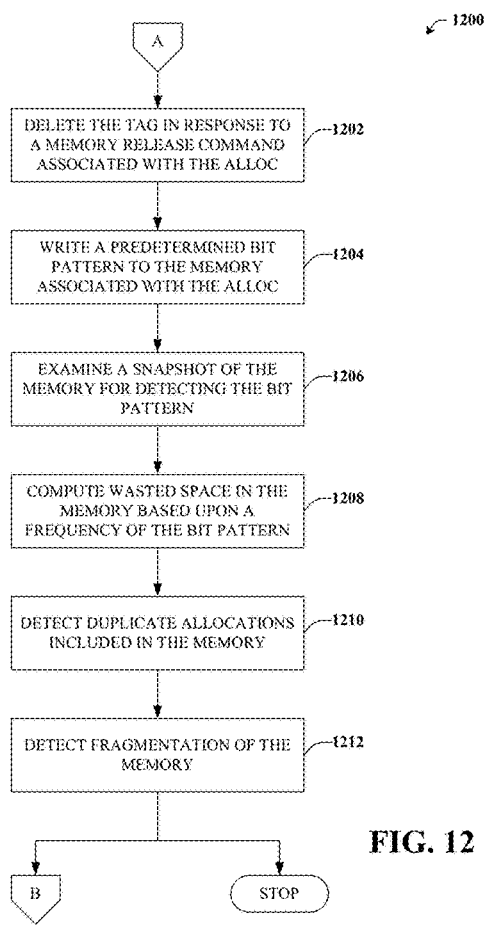
FIG. 12 is an exemplary non-limiting flow diagram for providing additional features or aspects in connection with analyzing computer-based memory provisioning and resulting presentation.
Figure 13:
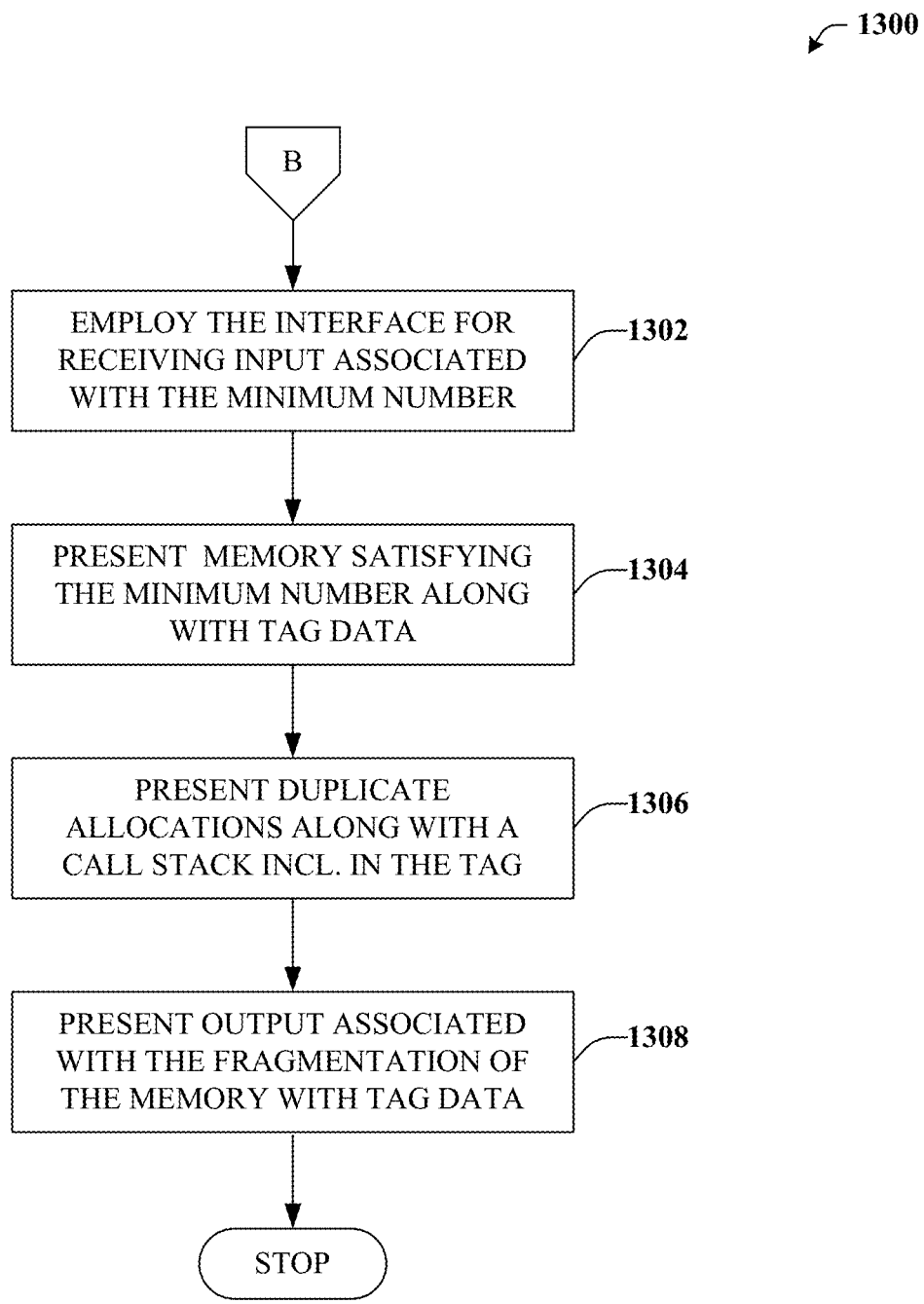
FIG. 13 is an exemplary non-limiting flow diagram for presenting additional data in connection with analyzing computer-based memory provisioning.

FIGS. 11-13 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers.

Referring now to FIG. 11, exemplary method 1100 for analyzing computer-based memory provisioning and presenting results of the analysis is depicted. Generally, at reference numeral 1102, at least one tag included in a private heap of memory can be accessed. The at least one tag can include a call stack associated with a memory allocation command that allocates a portion of the memory according to a command from a process executed by a computer-based processor.

Moreover, at reference numeral 1104, input associated with the memory can be received. For example, the input can relate to a particular view or feature of the memory that is to be analyzed or presented. Thus, at reference numeral 1106, the memory can be analyzed in connection with data included in that eat least one tag based upon the input. Hence, at 1108, output associated with the analyzing can be presented. For instance, output associated with one or more views of the memory.

Turning now to FIG. 12, exemplary method 1200 for providing additional features or aspects in connection with analyzing computer-based memory provisioning and resulting presentation is illustrated. For example, at reference numeral 1202, the at least one tag discussed at reference numeral 1102 of FIG. 11 can be deleted in response to a memory release command associated with the memory allocation command (e.g., the memory allocation command that lead to the creation of the tag).

Furthermore, at reference numeral 1204, a predetermined bit pattern can be written to the memory associated with the memory allocation instruction. For example, the predetermined bit pattern can be based upon a default pattern, based upon an input (e.g., from a user), or based upon an operating system or allocation protocol or requirement. For instance, memory allocated by a VirtualAlloc instruction typically formats the allocated bits with zeros by convention.

At reference numeral 1206, a snapshot of the memory can be examined for detecting at least one instance of the predetermined bit pattern within the memory. For example, the predetermined bit pattern written to the memory in connection with reference numeral 1204 as that portion of memory is newly allocated. Likewise, at reference numeral 1208, wasted space in the memory can be computed based upon a function of a number of instances of the predetermined bit pattern. For example, if the predetermined bit pattern represents, say, 50% of the allocated space, then such is an indication over-allocation or some other type of memory waste. Similarly, at reference numeral 1210, duplicate allocations included in the computer memory can be detected. Likewise, at reference numeral 1212, fragmentation of the memory can be detected.

With reference now to FIG. 13, exemplary method 1300 for presenting additional data in connection with analyzing computer-based memory provisioning is depicted. In general, at reference numeral 1302, an interface can be employed for receiving input associated with a minimum number of consecutive instances of the predetermined bit pattern discussed in connection with reference numeral 1204 of FIG. 12. Similarly, at reference numeral 1304, the interface can be employed for presenting at least one portion of the memory satisfying the minimum number along with suitable data included in an associated tag. Hence, the interface can receive the minimum number and can further present references to the predetermined bit pattern so long as there are at least a particular minimum number of consecutive instances of the predetermined bit pattern.

Next to be described, at reference numeral 1306, the interface can be employed for presenting the at least a portion of the duplicate allocations detailed in connection with reference numeral 1210 of FIG. 12. The presentation of the at least a portion of the duplicate allocations can be provided along with a call stack associated with at least one of the duplicate allocations. Furthermore, at reference numeral 1308, the interface can be employed for presenting output associated with the fragmentation of the memory that was analyzed in connection with reference numeral 1212 of FIG. 12. The fragmentation of the memory can be presented along with suitable data included in an associated tag.

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of the subject disclosure.

Figure 14:
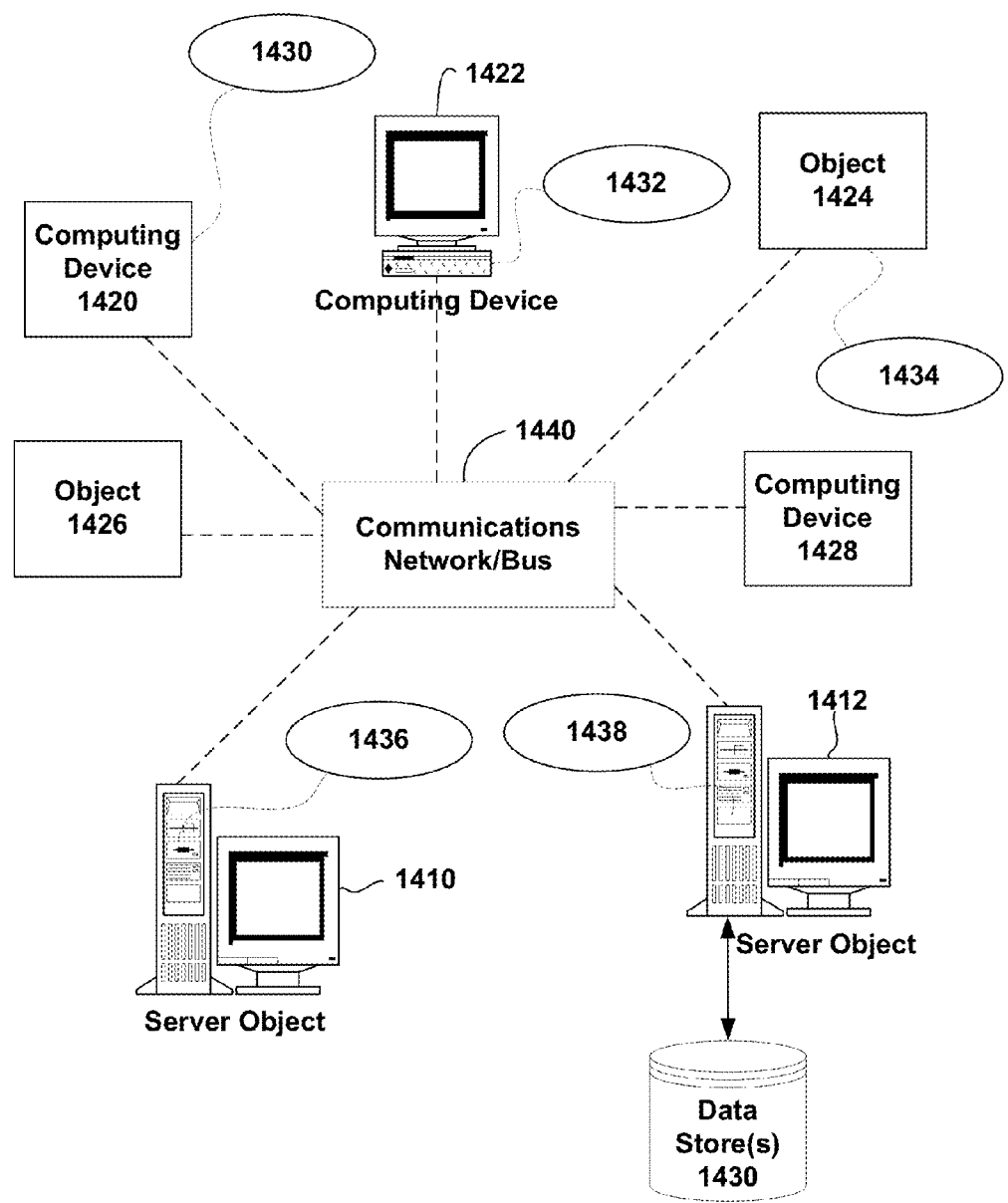
FIG. 14 is a block diagram representing an exemplary non-limiting networked environment in which the various embodiments may be implemented.

FIG. 14 provides a schematic diagram of an exemplary networked or distributed computing environment. The distributed computing environment comprises computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that computing objects 1410, 1412, etc. and computing objects or devices 1420, 1422, 1424, 1426, 1428, etc. may comprise different devices, such as PDAs, audio/video devices, mobile phones, MP3 players, personal computers, laptops, etc.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1440, either directly or indirectly. Even though illustrated as a single element in FIG. 14, network 1440 may comprise other computing objects and computing devices that provide services to the system of FIG. 14, and/or may represent multiple interconnected networks, which are not shown. Each computing object 1410, 1412, etc. or computing objects or devices 1420, 1422, 1424, 1426, 1428, etc. can also contain an application, such as applications 1430, 1432, 1434, 1436, 1438, that might make use of an API, or other object, software, firmware and/or hardware, suitable for communication with or implementation of the smooth streaming provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the dynamic composition systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc. provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances. Any of these computing devices may be processing data, or requesting transaction services or tasks that may implicate the techniques for dynamic composition systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 1440 is the Internet, for example, the computing objects 1410, 1412, etc. can be Web servers with which the client computing objects or devices 1420, 1422, 1424, 1426, 1428, etc. communicate via any of a number of known protocols, such as the hypertext transfer protocol (HTTP). Servers 1410, 1412, etc. may also serve as client computing objects or devices 1420, 1422, 1424, 1426, 1428, etc., as may be characteristic of a distributed computing environment.

Exemplary Computing Device

As mentioned, advantageously, the techniques described herein can be applied to any device where it is desirable to perform dynamic composition. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 2 is but one example of a computing device. Additionally, a database server can include one or more aspects of the below general purpose computer, such as a media server or consuming device for the dynamic composition techniques, or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 15:
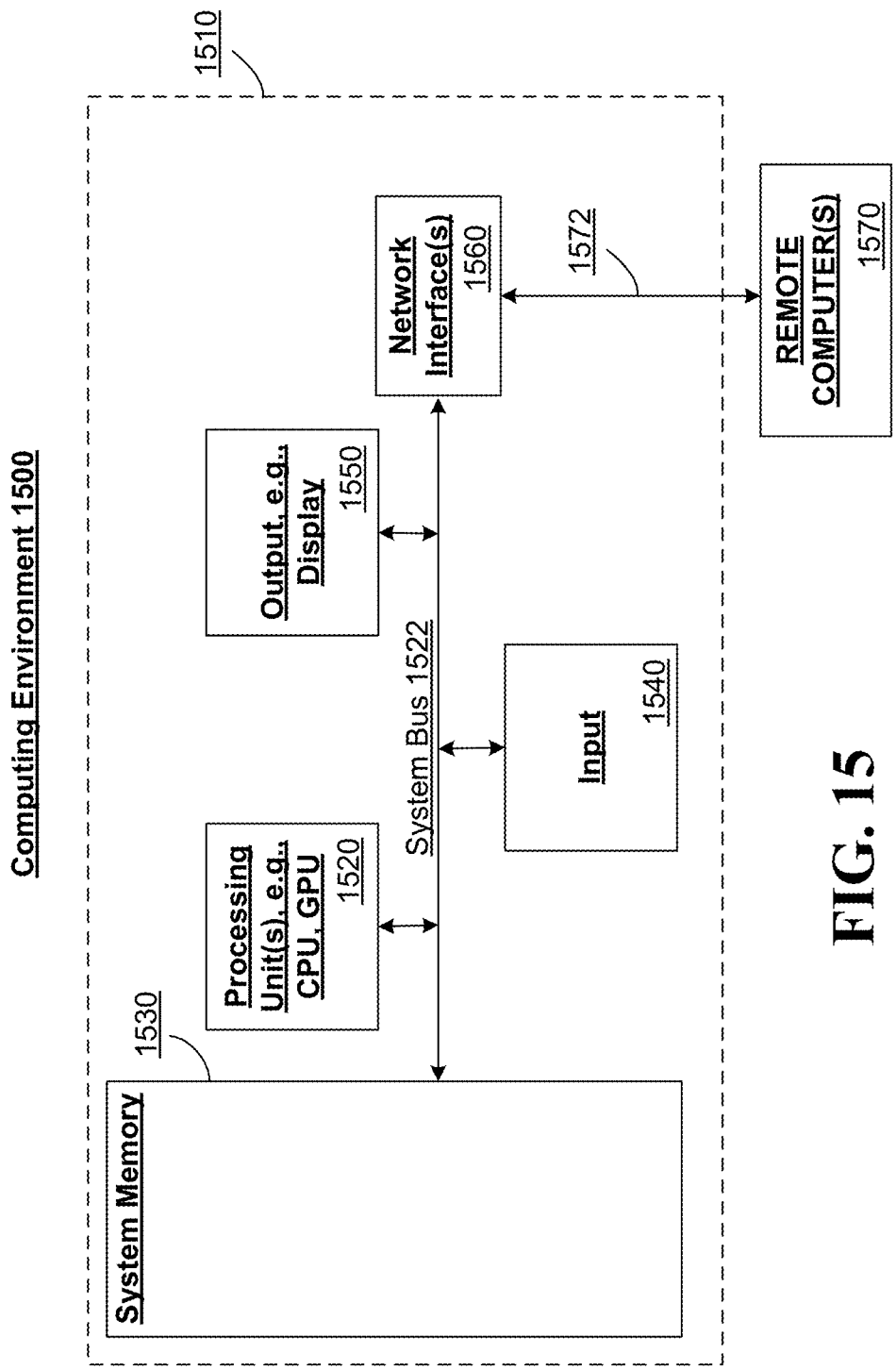
FIG. 15 is a block diagram representing an exemplary non-limiting computing system or operating environment in which the various embodiments may be implemented.

FIG. 15 thus illustrates an example of a suitable computing system environment 1500 in which one or aspects of the embodiments described herein can be implemented, although as made clear above, the computing system environment 1500 is only one example of a suitable computing environment and is not intended to suggest any limitation as to scope of use or functionality. Neither is the computing environment 1500 be interpreted as having any dependency or requirement relating to any one or combination of components illustrated in the exemplary operating environment 1500.

With reference to FIG. 15, an exemplary remote device for implementing one or more embodiments includes a general purpose computing device in the form of a computer 1510. Components of computer 1510 may include, but are not limited to, a processing unit 1520, a system memory 1530, and a system bus 1522 that couples various system components including the system memory to the processing unit 1520.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, memory 1530 may also include an operating system, application programs, other program modules, and program data.

A user can enter commands and information into the computer 1510 through input devices 1540. A monitor or other type of display device is also connected to the system bus 1522 via an interface, such as output interface 1550. In addition to a monitor, computers can also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the dynamic composition techniques. Thus, embodiments herein are contemplated from the standpoint of an API (or other software object), as well as from a software or hardware object that implements one or more aspects of the smooth streaming described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method performed by a computing device having a processor and a memory, the method comprising:
   with the processor,
      detecting one or more requests for memory allocation from a process executed by the processor;
      in response to a detected request for memory allocation, allocating a portion of the memory to the process, the allocated portion of the memory including a total number of bit locations;
      recording and storing an instance of a call stack associated with the detected request for memory allocation; and
      writing repeating instances of a bit pattern into the total number of bit locations;
   executing the process with the allocated portion of the memory;

determining a number of bit locations still containing the bit pattern; and analyzing usage of the allocated portion of the memory based on the determined number of bit locations still containing the bit pattern and the associated recorded instance of the call stack, wherein analyzing usage of the allocated portion of the memory includes determining an amount of unused memory space in the allocated portion of the memory based on the determined number of bit locations still containing the bit pattern.

2. The method of claim 1 wherein the bit pattern includes a set of consecutive bit values.

3. The method of claim 1 wherein analyzing usage of the allocated portion of the memory includes computing a percentage of wasted memory space in the allocated portion of the memory by dividing the determined number of bit locations still containing the bit pattern by the total number of the bit locations in the allocated portion of the memory.

4. A computing system, comprising:
a processor; and
a memory operatively coupled to the processor, the memory containing instructions that when executed by the processor cause the processor to perform a method comprising:
detecting one or more requests for memory allocation from a process executed by the processor;
in response to a detected request for memory allocation, allocating a portion of the memory to the process, the allocated portion of the memory including a total number of bit locations; and
writing repeating instances of a bit pattern into the total number of bit locations;
executing at least a part of the process with the allocated portion of the memory;
subsequently, determining a number of bit locations still containing the bit pattern; and
determining a usage characteristic of the allocated portion of the memory based on the determined number of bit locations still containing the bit pattern, wherein determining the usage characteristic includes setting the determined number of bit locations still containing the bit pattern as an amount of unused memory space in the allocated portion of the memory.

5. The computing system of claim 4 wherein the bit pattern includes a set of repetitive bit values.

6. The computing system of claim 4 wherein determining the usage characteristic includes determining an amount of wasted memory space in the allocated portion of the memory based on the determined number of bit locations still containing the bit pattern and a total number of the bit locations in the allocated portion of the memory.

7. A method performed by a computing device having a processor and a memory, the method comprising:
detecting one or more requests for memory allocation from a process executed by the processor;
in response to a detected request for memory allocation, allocating a portion of the memory to the process, the allocated portion of the memory including a total number of bit locations; and
writing repeating instances of a bit pattern into the total number of bit locations;
executing at least a part of the process with the allocated portion of the memory;
subsequently, determining a number of bit locations still containing the bit pattern; and determining a usage characteristic of the allocated portion of the memory based on the determined number of bit locations still containing the bit pattern, wherein determining the usage characteristic includes determining an amount of wasted memory space in the allocated portion of the memory based on the determined number of bit locations still containing the bit pattern and a total number of the bit locations in the allocated portion of the memory.

8. The method of claim 7, further comprising, in response to the detected request for memory allocation, recording and storing an instance of a call stack associated with the detected request for memory allocation.

9. The method of claim 7, further comprising, in response to the detected request for memory allocation, recording and storing an instance of a call stack associated with the detected request for memory allocation and deleting the stored instance of the call stack in response to receipt of a memory release instruction associated with the allocated portion of the memory.

10. The method of claim 7 wherein executing at least a part of the process includes overwriting at least a section of the allocated portion of the memory containing the repeating instances of a bit pattern.

11. The method of claim 7 wherein the bit pattern is based upon user input.

12. The method of claim 7 wherein the bit pattern includes a set of consecutive zeroes.

13. The method of claim 7 wherein determining the number of bit locations includes examining a snapshot of the allocated portion of the memory and detecting at least one instance of the bit pattern in the allocated portion of the memory.

14. The method of claim 7, further comprising receiving input associated with a minimum number of consecutive instances of the bit pattern and presenting to a user at least one section of the allocated portion of the memory that satisfies the minimum number.

15. The method of claim 7, further comprising calculating a percentage of wasted memory based on the determined number of bit locations still containing the bit pattern and a total number of the bit locations in the allocated portion of the memory.

16. The method of claim 7, further comprising:
in response to the detected request for memory allocation, recording and storing an instance of a call stack associated with the detected request for memory allocation; and
detecting duplicate allocation in the memory based on the recorded and stored instance of the call stack associated with the detected request for memory allocation.

17. The method of claim 16, further comprising presenting the detected duplicate allocation along with a corresponding call stack.

18. The method of claim 7, further comprising sorting at least a section of the allocated portion of the memory by address to detect fragmentation of the allocated portion of the memory.

19. The method of claim 18, further comprising sorting according to at least one of a size or content of the detected fragmentation.

20. The method of claim 18, further comprising presenting to a user output associated with the detected fragmentation.

* * * * *